(12) United States Patent
Maghsoodi et al.

(10) Patent No.: US 10,030,714 B2
(45) Date of Patent: Jul. 24, 2018

(54) CLUTCH INCLUDING A PUMP

(71) Applicant: Goodrich Corporation, Charlotte, NC (US)

(72) Inventors: Bejan Maghsoodi, Diamond Bar, CA (US); Owen Riehle, Orange, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 451 days.

(21) Appl. No.: 14/715,820

(22) Filed: May 19, 2015

(65) Prior Publication Data

US 2016/0341259 A1 Nov. 24, 2016

(51) Int. Cl.

| F16D 13/72 | (2006.01) |
| F16D 13/38 | (2006.01) |
| F16D 43/21 | (2006.01) |
| F16D 7/02 | (2006.01) |
| B66D 1/16 | (2006.01) |
| F16D 13/56 | (2006.01) |
| F16D 25/12 | (2006.01) |

(52) U.S. Cl.
CPC .............. *F16D 13/72* (2013.01); *B66D 1/16* (2013.01); *F16D 7/027* (2013.01); *F16D 13/38* (2013.01); *F16D 13/56* (2013.01); *F16D 43/216* (2013.01); *F16D 25/123* (2013.01)

(58) Field of Classification Search
None
See application file for complete search history.

(56) References Cited

U.S. PATENT DOCUMENTS

| 3,511,349 | A | 5/1970 | Herscovici |
| 4,029,189 | A | 6/1977 | Freiburger |
| 4,060,159 | A | 11/1977 | Chaney et al. |
| 4,183,425 | A | 1/1980 | Sommer |
| 6,378,682 | B1 | 4/2002 | Mohan et al. |
| 6,578,685 | B2 * | 6/2003 | Porter ..................... F16D 25/14 |
| | | | 180/197 |
| 7,487,954 | B2 * | 2/2009 | Copp ....................... B66D 1/16 |
| | | | 192/70.12 |
| 2007/0191172 | A1 | 8/2007 | Yoshioka |

FOREIGN PATENT DOCUMENTS

| EP | 0926378 A2 | 6/1999 |
| GB | 970720 A | 9/1964 |
| WO | 9924731 A1 | 5/1999 |

OTHER PUBLICATIONS

European Search Report for Application No. 16170398.8-1751, dated Oct. 7, 2016, 7 PAGES.

* cited by examiner

*Primary Examiner* — Mark A Manley
(74) *Attorney, Agent, or Firm* — Cantor Colburn LLP

(57) ABSTRACT

A clutch comprising a pump is disclosed. The pump is operatively connected to the clutch such that a clutch slip event will cause the pump to delivery fluid from a fluid source to a region surrounding the friction plates of the clutch. The operation of the pump manages heat that is generated by the dynamic friction of the slipping clutch plates. The pump and associated fluid delivery methods are removably securable to an upstream end of an input shaft of the clutch. This allows the pump and associated fluid delivery methods to be used as modular components, that are easy to remove and replace for maintenance purposes, it also allows easier access to the internals of the clutch for maintenance.

17 Claims, 3 Drawing Sheets

CLUTCH INCLUDING A PUMP

TECHNICAL FIELD

The present disclosure relates to a clutch including a pump, and particularly to a clutch for a winch including a pump, and methods for removing heat from a clutch and assembling a clutch.

BACKGROUND

When using a winch to raise a payload, a winch cable is attached to a motor-driven drum at one end and the payload at the other. The motor is driven to rotate the drum in order to gather up the winch cable on the outer circumference of the drum. In a modern hoist or winch system, a clutch is provided to limit the torque applied to the drum. The clutch comprises input and output friction plates that are biased together into frictional engagement with each other, to allow the transfer of drive from the motor to the drum through the clutch. The biasing of the plates is set to allow the plates to slip relative to each other at a particular maximum torque value suitable for the clutch. The slipping of the plates will disconnect the motor from driving the drum. The clutch therefore prevents an overload from damaging the winch, motor or the structure it is attached to.

When the plates slip relative to each other the dynamic friction between them will generate significant heat. If unchecked, this heat may cause damage to the plates or other internal components of the clutch. This may compromise the lifetime or effectiveness of the clutch/winch system.

SUMMARY

It is the aim of the present disclosure to manage the heat generated when the clutch slips to improve the overall lifetime and effectiveness of the clutch.

It will be appreciated by one skilled in the art that "winch" or "hoist" refer to the same apparatus, and for the purposes of this disclosure, the terms may be used interchangeably. Only a winch shall be referred to in the description, however, in accordance with the above, any reference to a winch could equally refer to a hoist.

From a first aspect, the present disclosure provides a clutch for driving a winch. The clutch comprises an input shaft, an output shaft and a pump. The input shaft is configured for connection to a motor and is operatively connected to at least one input friction plate for rotation therewith. The output shaft is configured for driving a winch, is coaxial with and has at least a portion radially within the input shaft, and is operatively connected to at least one output friction plate for rotation therewith. The at least one input friction plate and the at least one output friction plate are in contact with each other so that torque can be transferred from the input shaft to the output shaft via the input and output friction plates. The pump comprises an inlet, an outlet, an outer rotor, and an inner rotor. The inlet is configured for connection to a fluid source. The outlet is in fluid communication with the input and output friction plates. The outer rotor is operatively connected to the input shaft for rotation therewith. The inner rotor has at least a portion radially within the outer rotor and is operatively connected to the output shaft for rotation therewith. Differential rotation of the input shaft and the output shaft causes the pump to pump fluid to the friction plates.

It is to be understood that, for the purposes of this disclosure, a first rotating member (e.g. a shaft or rotor) having "at least a portion radially within" a second rotating member means at least an axial portion of the first rotating member is located inside the second rotating member relative to the axis of rotation of the rotating members.

In accordance with an embodiment of the first aspect, the outer rotor is arranged to rotate about a first axis and the inner rotor is arranged to rotate about a second axis that is not aligned with the first axis (i.e. the first and second axis are not coaxial).

In accordance with an embodiment of the first aspect, the pump is a positive displacement pump. For instance, in one particular embodiment, the pump is a gerotor pump.

In accordance with an embodiment of the first aspect, the output shaft comprises an outer shaft and an inner shaft. The inner shaft is disposed coaxially with and has at least a portion radially within the outer shaft and is operatively connected to the outer shaft for rotation therewith. The inner rotor may be in operative connection with the output shaft via the inner shaft.

In accordance with an embodiment of the first aspect, the inner shaft further comprises a central bore in fluid communication with the outlet of the pump and first fluid delivery channels in fluid communication with the input and output friction plates.

In accordance with an embodiment of the first aspect, the outer shaft includes second fluid delivery channels therethrough which are in fluid communication with the first fluid delivery channels of the inner shaft and the input and output friction plates.

In accordance with an embodiment of the first aspect, the pump further comprises an outlet plate operatively connected to the inner rotor such that the inner rotor rotates therewith. The outlet plate further comprises one or more first protrusions extending therefrom. The inner shaft includes one or more first recesses at a connection end thereof and the one or more first protrusions engage with the one or more first recesses to operatively connect the inner rotor to the inner shaft.

In accordance with an embodiment of the first aspect, the outer rotor comprises one or more second recesses on an outer surface thereof. An inner surface of the input shaft includes one or more second protrusions extending therefrom, and the one or more second protrusions engage the one or more second recesses to operatively connect the outer rotor to the input shaft.

In accordance with an embodiment of the first aspect, the input shaft includes a first end located adjacent the at least one input friction plate (e.g. radially aligned with the input friction plate) and an opposed, open second end. The pump has at least a portion radially within the input shaft and is accessible or removable via the second end.

The pump may be located completely within the input shaft, for example, at or near the second end of the input shaft. The pump may be removably attached to the input and output shafts such that it can be removed therefrom via the second end of the input shaft.

In accordance with an embodiment of the first aspect, the pump further comprises an inlet seal. The inlet seal seals the pump radially within the input shaft.

In accordance with an embodiment of the first aspect, the inner shaft is removably secured to the outer shaft.

From a second aspect, the present disclosure provides a clutch for driving a winch. The clutch comprises an input shaft, an output shaft and a pump. The input shaft is configured for connection to a motor and is operatively connected to at least one input friction plate for rotation therewith. The output shaft is configured for driving a winch, is coaxial with and has at least a portion that is radially within the input shaft, and is operatively connected to at least one output friction plate for rotation therewith. The at least one input friction plate and the at least one output friction plate are in contact with each other so that torque can be transferred from the input shaft to the output shaft via the input and output friction plates. The pump has an inlet for connection to a fluid source and an outlet in fluid communication with the input and output friction plates. Differential rotation of the input shaft and the output shaft causes the pump to pump fluid to the input and output friction plates.

It is to be understood that any of the embodiments described in relation to the first aspect above apply equally to the second aspect.

From a third aspect, the present disclosure provides a method for removing heat from a clutch in accordance with any of the above embodiments or aspects. The method comprises the step of delivering fluid from a fluid source to the input and output friction plates during a clutch slip event.

In accordance with an embodiment of the third aspect, the clutch slip event provides differential rotation of the inner rotor and the outer rotor of the pump to deliver fluid from the fluid source to the friction plates.

From a fourth aspect, the present disclosure provides a method of assembling a clutch. The clutch comprises an input shaft and an output shaft. The input is configured for connection to a motor and has a first end located adjacent at least one input friction plate for rotation therewith and an opposed second end. The output shaft is configured for driving a winch, is coaxial with and has at least a portion radially within the input shaft, and is operatively connected to at least one output friction plate for rotation therewith. The at least one input friction plate and the at least one output friction plate are in contact with each other so that torque can be transferred from the input shaft to the output shaft via the input and output friction plates. The method comprises the step of removably securing a pump to the second end of the input shaft. The pump comprises an inlet, an outlet, an inner rotor and an outer rotor. The inlet is configured for connection to a fluid source. The outlet is in fluid communication with the friction plates. The outer rotor is operatively connected to the input shaft for rotation therewith. The inner rotor has at least a portion radially within the outer rotor and is operatively connected to the output shaft for rotation therewith.

In accordance with an embodiment of the fourth aspect, the step of removably securing the pump includes using an inlet seal to seal the pump radially within the input shaft.

In accordance with an embodiment of the fourth aspect, the output shaft comprises an outer shaft and an inner shaft and the method further comprises the step of removably securing the inner shaft coaxially with and at least partially within the outer shaft for rotation therewith, prior to the step of removably securing the pump.

In accordance with an embodiment of the fourth aspect, the inner shaft and pump are removably engaged with each other.

Although the clutch of the above aspects is primarily directed towards a clutch for a winch, it should be understood that the clutch may also be suitable for any other clutch application where dynamic friction between slipping clutch plates generates unwanted heat.

BRIEF DESCRIPTION OF THE DRAWINGS

Exemplary embodiments and features of the present disclosure will now be described by way of example only, and with reference to FIGS. 1 to 3c, of which.

DETAILED DESCRIPTION

Figure 1:
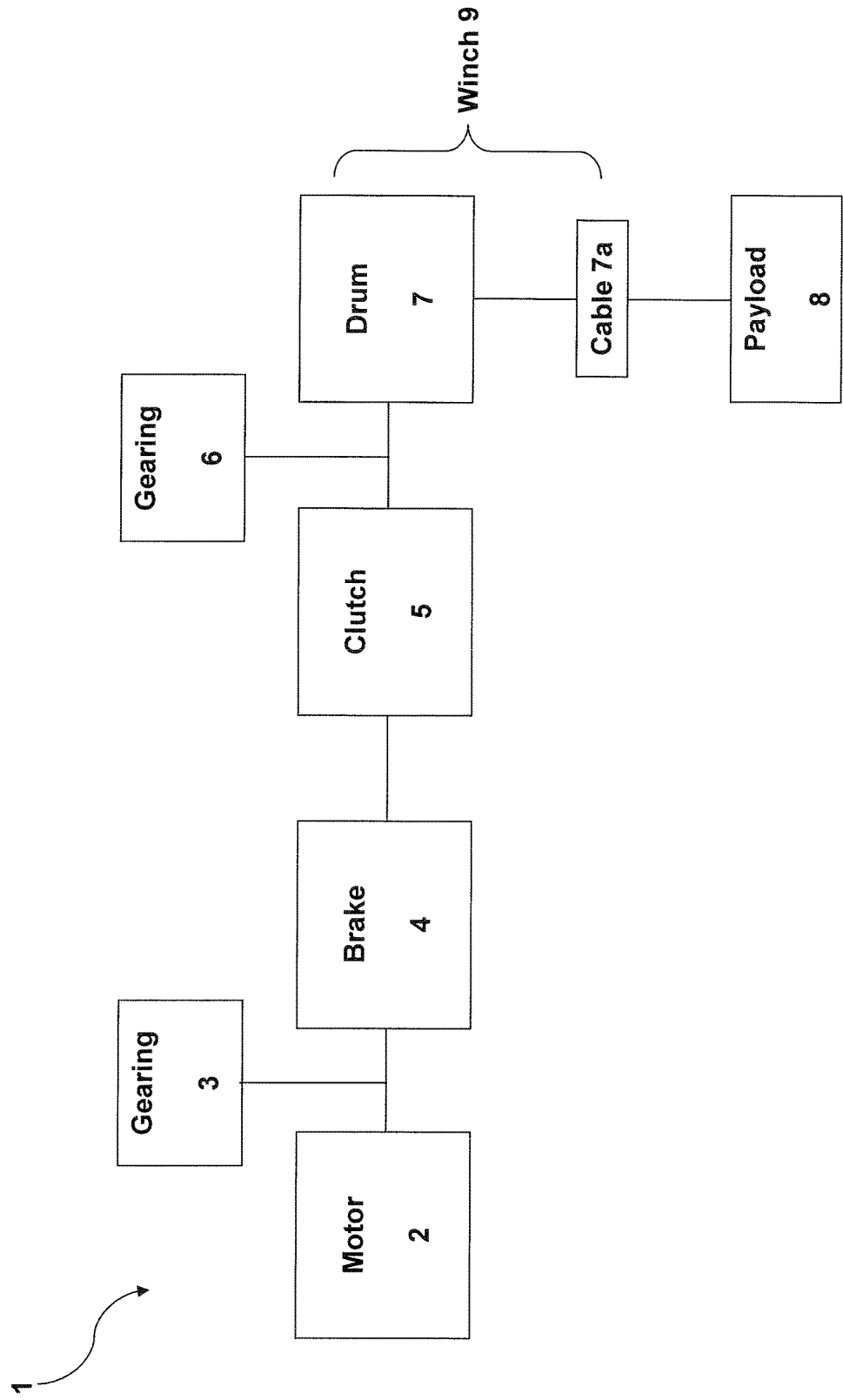
FIG. 1 is an overview of a winch system, in accordance with the present disclosure.

FIG. 1 shows an overview of a typical winch system 1, as is known in the art. A driving means, such as a motor 2, is operatively connected to a brake 4 through gearing 3, which is operatively connected to a clutch 5, which is operatively connected to a drum 7 through gearing 6. The motor 2 is activated to provide drive to the drum 7 through the gearing 3, brake 4, clutch 5 and gearing 6, in order to reel in (or out) a winch cable 7a to lift (or drop) a payload 8. The drum 7 and cable 7a together form a winch 9. The brake 4 is provided as a means to stop cable winding without disengaging motor 1, whereas clutch 5 acts as a moderating means for the drive, allowing the drum 7 to be disconnected from the motor 2 should the drum 7 become overloaded (as described above).

Figure 2:
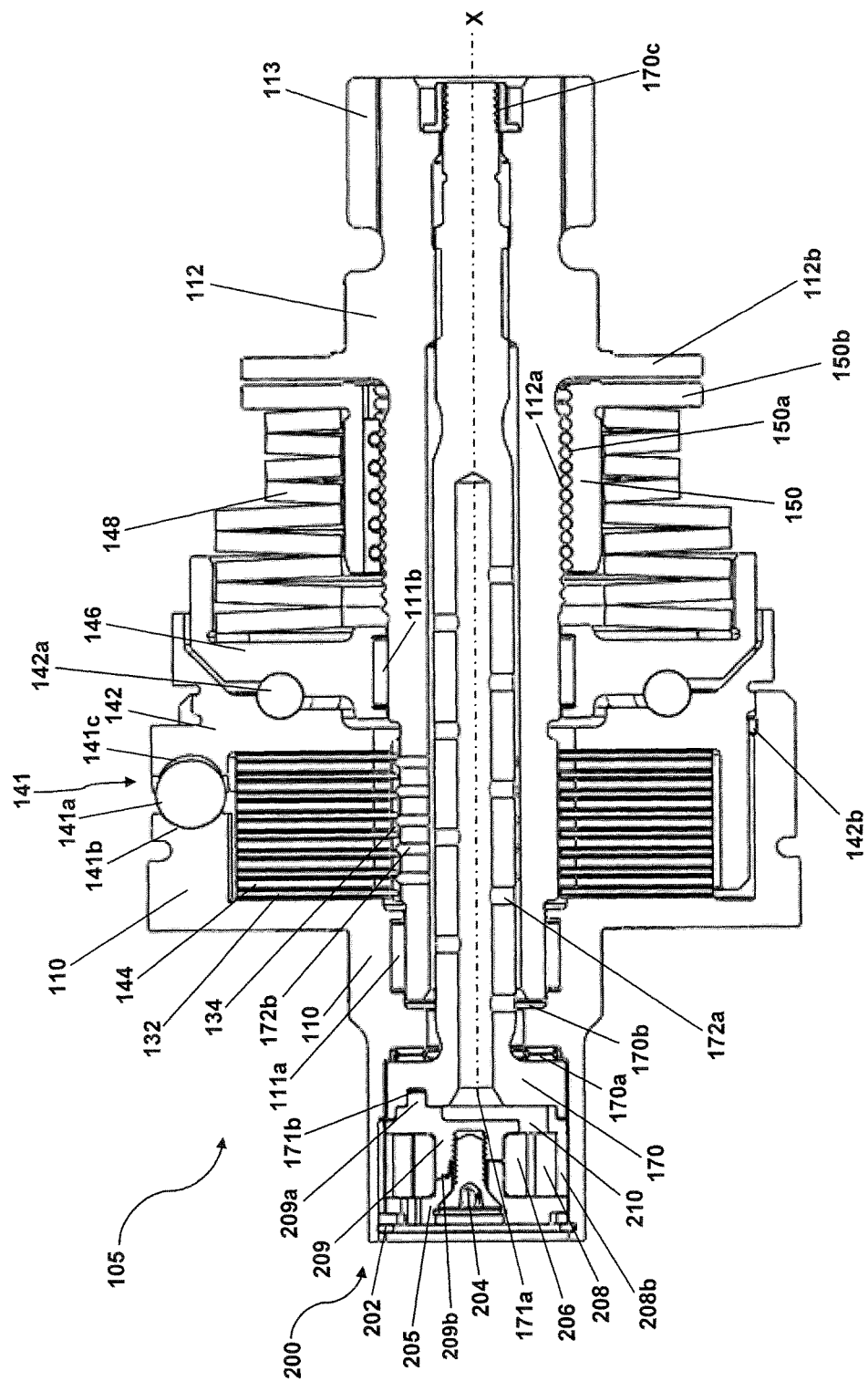
FIG. 2 is a cross-section of a clutch, in accordance with one embodiment of the present disclosure.

FIG. 2 shows a cross-section of an exemplary embodiment of a clutch 105 in accordance with this disclosure.

The component parts that make up clutch 105, and an explanation of the basic operation of clutch 105 in order to transfer and moderate drive from motor 2 to drum 7, will now be described.

Clutch 105 comprises an input shaft 110 connected to motor 2 (not shown) and rotatable about axis X. Clutch 105 also comprises an output shaft 112 arranged co-axially with the input shaft 110 and rotatable about axis X. Output shaft 112 is supported in place by a roller bearing 111a disposed between its outer surface and an inner surface of input shaft 110. The roller bearing allows input shaft 110 and output shaft 112 to rotate relative to each other. Output shaft 112 further comprises an output gear 113 at an output end thereof, in order to facilitate transfer of drive to the winch drum 7 (not shown).

The clutch 105 may be attached to a support structure (not shown). The support structure may be part of the apparatus the winch is installed on. The winch may be installed on a vehicle, for example an aircraft, such as a helicopter, or may be installed on a something other than a vehicle, for example a crane (whether stationary or mobile) or on a building.

The clutch 105 is used to selectively transfer the rotation (drive) of the input shaft 110 to the output shaft 112.

Input friction plates 144 are operatively connected to the input shaft 110 via a ball-ramp assembly 141, and intervening output friction plates 132 attached to an output flange 134, which is fixedly attached to output shaft 112 for rotating therewith.

Input friction plates 144 are attached to ball-ramp flange 142 of ball-ramp assembly 141. Ball-ramp assembly 141 is operatively connected to input shaft 110 via balls 141a, which are held in a recess 141c at one end of flange 142 and a recess 141b in input shaft 110.

Clutch 105 further comprises a spring pack 148 comprising disc springs (i.e. Belleville springs or washers). In this particular embodiment, the disc springs are coaxial with the output shaft 112 and centred around the output shaft 112. The spring pack 148 is held in place via a spring pack retaining flange 150. In this particular embodiment, retaining flange 150 includes a thread 150a on an inner surface thereof, which is configured to co-operatively engage with a thread 112a on the outer surface of output shaft 112. The threads maybe acme threads or any other suitable thread type. The spring pack 148 and the spring pack retaining flange 150 rotate with the output shaft 112 (about axis X).

It is to be understood that this retaining flange 150 is only exemplary for illustration purposes and any other suitable method of retaining spring pack 148 may be used within the scope of this disclosure. For instance, in one alternative embodiment, retaining flange may be fixed to output shaft and rotatable therewith. In another alternative embodiment, spring pack 148 may be retained by the output shaft directly rather than by a retaining flange. For instance spring pack 148 may be retained in a notch in the output shaft.

The spring pack 148 is in mechanical communication with a connecting arm 146 and a plurality of ball bearings 142a, so that it can rotate relative to the ball ramp flange 142. The connecting arm 146 is supported around output shaft 112 by a roller bearing 111b. Bearing 142a is located in recesses in the flange 142 and the connecting arm 146. Spring pack 148 is fixed to retaining flange 150, such that it exerts a spring bias on connecting arm 146.

Clutch 105 allows rotation of the input shaft 110 to be transferred to the output shaft 112 via spring loaded engagement of the input friction plates 144 with the output friction plates 132, and the maximum permitted amount of torque transferred from the input shaft 110 to the output shaft 112, and vice versa, can be controlled by adjusting the degree of spring loading.

Ball-ramp assembly 141 is used to moderate and minimise the torque setting variation encountered when operating the clutch 105, by adjusting the force with which the input plates 144 are pressed upon output plates 132. As described above, ball 141a engages the input shaft 110 and the ball-ramp flange 142 in opposing recesses 141b, 141c therein. As is known in the art, such as disclosed in U.S. Pat. No. 3,511,349, the recesses are shaped to act as cam members that cams the ball 141a to increase or decrease the separation between the pairs of recesses 141b, 141c that hold each ball 141a in place.

As the friction characteristics of the friction plates 132, 144 vary, the force exerted by the input friction plates 144 on the output friction plates 132 varies. If the coefficient of friction between the input and output friction plates 132, 144 increases, the maximum torque able to be transmitted through the clutch 105 before slipping will also increase. However, as the torque transmitted through the clutch 105 increases, the separating force between the recesses 141a, 141b will increase and thus, the friction between friction plates 132, 144 will decrease. As such, the maximum transmitted torque before slipping will subsequently decrease. As will be understood by one skilled in the art, the ball-ramp assembly 141 therefore counteracts the effects of friction variations at the friction plates 132, 144, and thus minimises them to retain the torque slipping thresholds of the clutch 105. This provides an advantage over clutches not having a ball-ramp assembly.

It is to be understood, however, that clutch 105 need not include a ball-ramp assembly. For instance, the input shaft may further comprise an input plate flange that is operatively connected to the input friction plates and is biased directly by the spring pack, rather than through a ball-ramp assembly, as illustrated.

Additional components of the clutch 105 and methods of operation used to achieve the aims of the present disclosure will now be described.

Clutch 105 further comprises an inner shaft 170 fitted co-axially inside output shaft 112. Inner shaft 170 is secured to the output shaft 112 via a snap ring 170b and locking nut 170c. Inner shaft 170 is further supported by roller bearing 170a disposed between the input shaft 110 and the outer surface of the chamber 170. Inner shaft 170 further comprises a central bore 171a along a portion of the axial extent thereof and first delivery channels 172a through a radial width thereof. First delivery channels 172a are in fluid communication with second delivery channels 172b in the output shaft 112. The first and second delivery channels 172a, 172b allow delivery of hydraulic fluid (e.g. oil) to the friction plate region of the clutch for heat management and/or lubrication, as will be described further below.

Clutch 105 further comprises a pump 200, located radially within the input shaft 110.

Pump 200 is in fluid communication with a hydraulic fluid supply (e.g. a hydraulic fluid reservoir)(not shown), and is operable during a clutch slip event to pump hydraulic fluid through inner shaft 170 and to the friction plates 132, 144 (via first and second delivery channels 172a, 172b). This operation of pump 200 is used to cool the friction plates 132, 144, by removing heat generated by the dynamic friction between friction plates 132, 144 during a clutch slip event (e.g. by dissipating heat to other areas of the clutch 105 or to the surroundings).

Figure 3C:
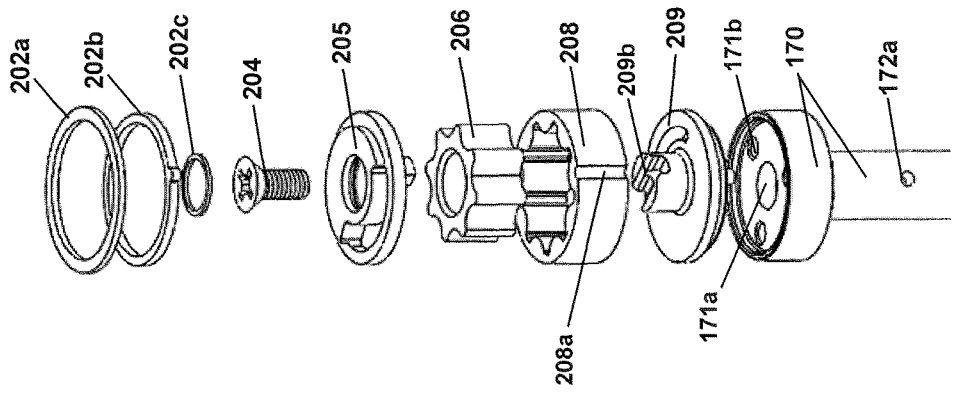
FIG. 3c is an exploded view of FIG. 3b.
Figure 3B:
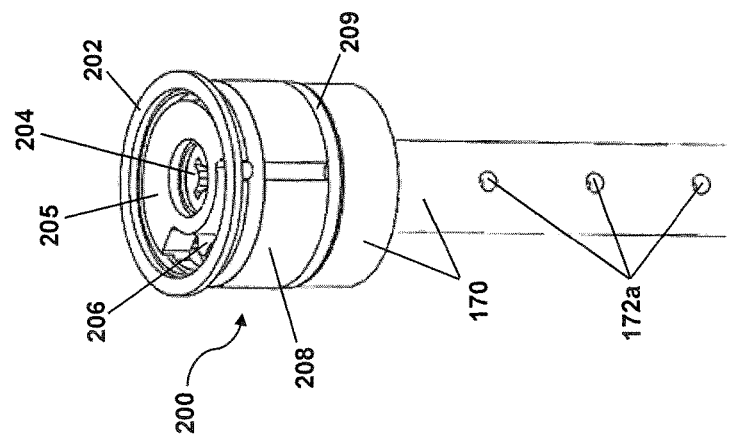
FIG. 3b is a view of a pump and an inner shaft of the clutch of FIG. 2 in accordance with an embodiment of the present disclosure.
Figure 3A:
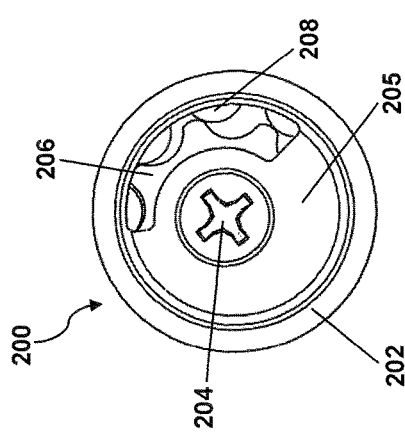
FIG. 3a is a view of a pump of the clutch of FIG. 2 in accordance with an embodiment of the present disclosure.

As can be seen in FIGS. 2 and 3a-3c, pump 200 comprises an outer rotor 208 and an inner rotor 206 disposed radially within the outer rotor 208. Inner rotor 206 is mounted off-centre relative to a central axis of outer rotor 208 (e.g. off-centre of axis X). Outer rotor 208 comprises grooves therein and inner rotor 206 comprises teeth that fit within the grooves. The rotors 206, 208 are secured between inlet plate 205 and outlet plate 209 by fastener 204. Inlet plate 205 and outlet plate 209 feature inlet and outlet apertures 205a, 209c therein, that allow communication of fluid in to and out of the pump, respectively. The inlet plate 205 and outlet plate 209 each include projections 209b that protrude through the inner rotor 205 and support it for rotation inside the outer rotor 208. Fastener 204 secures the plates 205, 209 together by passing through a threaded section in the protrusions 206b. Pump 200 further comprises an inlet seal 202, comprised of two sealing support rings 202a, 202b and a washer 202c. As shown in FIGS. 3b and 3a, washer 202c is disposed in inlet plate 205 to help secure fastener 204 therein.

It will be apparent to one skilled in the art that pump 200 acts as a positive displacement pump, and specifically is a gerotor pump. It should be understood, however, than any suitable positive displacement pump mechanism, as would be apparent to one skilled in the art, may be used within the scope of this disclosure.

As shown in FIG. 2, support rings 202a, 202b secure and seal the pump 200 concentrically within extending portions of the input shaft 110. Removal of support rings 202a, 202b allow removal of the pump 200 from the clutch 105, for instance, for repair/replacement purposes. Outer rotor 208 features recesses 208a that are secured by retaining pins 208b which are fixedly secured to the extending portions of the input shaft 110. The engagement of recesses 208a via retaining pins 208b fixedly secures the outer rotor 208 to the output shaft 110, such that it rotates therewith. Outlet plate 209 features one or more dogs 209a that secure into recesses 171b in inner shaft 170. This allows fluid communication from the output aperture 209c of the pump 200 to central bore 171a in inner shaft 170. As will now be appreciated, this allows communication of fluid from pump 200 to the friction plate region of clutch 105. In addition, the securing of outlet plate 209 to inner shaft 170 allows rotation of the output shaft 112 to drive rotation of the inner rotor 206. Therefore, rotation of the inner rotor 206 is driven by rotation of the output shaft 112 and the rotation of the outer rotor 208 is driven by rotation of the input shaft 110.

The operation of pump 200 will now be described with reference to FIGS. 2 and 3a-3c.

As inner rotor 206 is off-centre relative to the outer rotor 208, small gaps will be left between some of the teeth of the inner rotor 206 and some of the grooves of the outer rotor 208. These gaps allow the communication of fluid into and through the pump 200. Rotation of the inner rotor 206 relative to the outer rotor 208 will draw fluid into the gaps through inlet aperture 205a and drive the fluid around the pump 200 and out through outlet apertures 209c. In embodiments of the present disclosure, this will deliver hydraulic fluid to the friction plate region (as discussed above).

As will be understood by one skilled in the art, when clutch 105 is transferring drive from the motor 2 to the drum 7 under normal operating conditions the input shaft 110 and the output shaft 112 rotate at the same speed. This will mean that inner rotor 206 and outer rotor 208 rotate at the same speed, and so do not exhibit relative rotation to each other. Therefore under normal operating conditions of clutch 105 pump 200 will not operate. However, when a slip event occurs, either of the input shaft 110 or the output shaft 112 will be rotating at a faster or slower rate relative to each other. This will provide a relative rotation between inner rotor 206 and outer rotor 208, which will operate pump 200. As will now be apparent, the operation of pump 200 in clutch 105 will only be activated during a clutch slip event. Therefore, pump 200 will only deliver hydraulic fluid to the friction plate region of clutch 105 when either of the input or output friction plates 144, 132 are slipping. This will supply hydraulic fluid to the friction plate region of the clutch 105 to manage heat generated by the dynamic friction between slipping friction plates 144, 132. As will be appreciated by one skilled in the art, a slip event is when such heat management is needed most.

In the illustrated embodiment, clutch 105 is a dry-type clutch and hydraulic fluid is only present at the friction plates 132, 144 when pumped there by pump 200 during a clutch slip event. It should be understood, however, that within the scope of this disclosure, clutch 105 may also be a wet-type clutch. In such a wet-type clutch, the friction plate region and/or other clutch regions are already immersed in hydraulic fluid (e.g. oil), as in known in the art. In such a system, operation of pump 200 will encourage re-circulation of the hydraulic fluid to aid heat management during a clutch slip event, as opposed to introducing fluid to initially cool the region.

A wet-type clutch may provide advantages over a dry-type clutch during normal clutch operation, such as better lubrication and/or heat management, as would be apparent to one skilled in the art. A dry-type clutch, however, may provide other advantages such as simplicity, cost and maintenance.

It is to be understood that the construction and operating characteristics of pump 200 and/or inner shaft 170 allow them to act advantageously as a modular or stand-alone component or components. In previous pumps for clutches, the pump has been known to be integral to the clutch itself, for instance, pump rotors may be integrated with the input and output shafts directly, or the pump disposed at an internal connection therebetween. Such a construction may provide added complexity and costs compared to that of the present disclosure. The design of the pump 200 and/or inner shaft 170 and the attachment features therebetween or relative to the input shaft 110 and output shaft 112, make them easy to remove and/or replace. This provides advantages over the aforementioned previous clutches.

Although the figures and the accompanying description describe particular embodiments, it is to be understood that the scope of this disclosure is not to be limited to such specific embodiments, and is, instead, to be determined by the scope of the following claims.

The invention claimed is:

1. A clutch for driving a winch, the clutch comprising: an input shaft for connection to a motor and being operatively connected to at least one input friction plate for rotation therewith; an output shaft for driving a winch, the output shaft being coaxial with and having at least a portion radially within the input shaft, and being operatively connected to at least one output friction plate for rotation therewith, wherein the at least one input friction plate and the at least one output friction plate are in contact with each other so that torque can be transferred from the input shaft to the output shaft via the input and output friction plates; and a pump comprising: an inlet for connection to a fluid source; an outlet in fluid communication with the input and output friction plates; an outer rotor operatively connected to the input shaft for rotation therewith; and an inner rotor having at least a portion radially within the outer rotor, the inner rotor being operatively connected to the output shaft for rotation therewith, wherein differential rotation of the input shaft and the output shaft causes the pump to pump fluid to the input and output friction plates, wherein the input shaft includes a first end located adjacent the at least one input friction plate and an opposed, open second end, wherein the pump has at least a portion radially within the input shaft and the pump is accessible and removable via the second end; wherein the input shaft includes a first end located adjacent the at least one input friction plate and an opposed, open second end, wherein the pump has at least a portion radially within the input shaft and the pump is accessible and removable via the second end; and wherein the open second end having a seal ring surrounding the open second end.

2. The clutch of claim 1, wherein the outer rotor is arranged to rotate about a first axis and the inner rotor is arranged to rotate about a second axis that is not aligned with the first axis.

3. The clutch of claim 1, wherein the pump is a positive displacement pump.

4. The clutch of claim 3, wherein the pump is a gerotor pump.

5. The clutch of claim 1, wherein the output shaft comprises an outer shaft and an inner shaft disposed coaxially with and having at least a portion radially within the outer shaft, wherein the inner shaft is operatively connected to the outer shaft for rotation therewith.

6. The clutch of claim 5, wherein the inner shaft further comprises:
a central bore in fluid communication with the outlet of the pump; and
first fluid delivery channels in fluid communication with the input and output friction plates.

7. The clutch of claim 6, wherein the outer shaft includes second fluid delivery channels therethrough in fluid communication with the first fluid delivery channels of the inner shaft and the input and output friction plates.

8. The clutch of claim 5, wherein:

the pump further comprises an outlet plate operatively connected to the inner rotor such that the inner rotor rotates therewith, wherein the outlet plate further comprises one or more first protrusions extending therefrom; and the inner shaft includes one or more first recesses at a connection end thereof, and the one or more first protrusions engage with the one or more first recesses to operatively connect the inner rotor to the inner shaft.

9. The clutch of claim 1, wherein the outer rotor comprises one or more second recesses on an outer surface thereof, an inner surface of the input shaft includes one or more second protrusions extending therefrom, and the one or more second protrusions engage the one or more second recesses to operatively connect the outer rotor to the input shaft.

10. The clutch of claim 1, wherein the pump further comprises an inlet seal, wherein the inlet seal seals the pump radially within the input shaft.

11. The clutch of claim 5, wherein the inner shaft is removably secured to the outer shaft.

12. A method for removing heat from the clutch of claim 1, the method comprising the step of delivering fluid from a fluid source to the input and output friction plates during a clutch slip event.

13. The method of claim 12, wherein a clutch slip event provides differential rotation of the inner rotor and the outer rotor of the pump to deliver fluid from the fluid source to the input and output friction plates.

14. A method of assembling a clutch, wherein the clutch comprises: an input shaft for connection to a motor, the input shaft having a first end located adjacent at least one input friction plate for rotation therewith and an opposed, open second end; the open second end having a seal ring surrounding the open second end; an output shaft for driving a winch, the output shaft being coaxial with and having at least a portion radially within the input shaft, and being operatively connected to at least one output friction plate for rotation therewith, wherein the at least one input friction plate and the at least one output friction plate are in contact with each other so that torque can be transferred from the input shaft to the output shaft via the input and output friction plates; and the method comprising the step of removably securing a pump through the open second end of the input shaft, wherein the pump comprises: an inlet for connection to a fluid source; an outlet in fluid communication with the input and output friction plates; an outer rotor operatively connected to the input shaft for rotation therewith; and an inner rotor having at least a portion radially within the outer rotor, the inner rotor being operatively connected to the output shaft for rotation therewith.

15. The method of claim 14, wherein the step of removably securing the pump includes using an inlet seal to seal the pump radially within the input shaft.

16. The method of claim 14, wherein the output shaft comprises an outer shaft and an inner shaft and the method further comprises the step of removably securing the inner shaft coaxially with and at least partially within the outer shaft for rotation therewith, prior to the step of removably securing the pump.

17. The method of claim 16, wherein the inner shaft and pump are removably engaged with each other.

\* \* \* \* \*